(12) United States Patent
Leggott et al.

(10) Patent No.: US 8,984,972 B2
(45) Date of Patent: Mar. 24, 2015

(54) POWER TAKE-OFF SYSTEM FOR AN INTERNAL COMBUSTION ENGINE

(71) Applicant: Cummins IP, Inc., Minneapolis, MN (US)

(72) Inventors: Paul A. Leggott, Darlington (GB); Jack R. Johnson, Darlington (GB)

(73) Assignee: Cummins IP, Inc., Minneapolis, MN (US)

(*) Notice: Subject to any disclaimer, the term of this patent is extended or adjusted under 35 U.S.C. 154(b) by 269 days.

(21) Appl. No.: 13/739,936

(22) Filed: Jan. 11, 2013

(65) Prior Publication Data

US 2014/0196551 A1 Jul. 17, 2014

(51) Int. Cl.
| | |
|---|---|
| F16H 37/00 | (2006.01) |
| F16H 57/027 | (2012.01) |
| F01M 13/00 | (2006.01) |

(52) U.S. Cl.
CPC ............. *F16H 57/027* (2013.01); *F01M 13/00* (2013.01)
USPC .......................... 74/11; 123/90.31; 123/195 R

(58) Field of Classification Search
USPC ........... 74/11; 123/41.86, 73 R, 90.31, 195 R
See application file for complete search history.

(56) References Cited

U.S. PATENT DOCUMENTS

| | | | |
|---|---|---|---|
| 2,758,672 A | 8/1956 | Anderson et al. | |
| 3,146,720 A | 9/1964 | Henry | |
| 3,262,393 A | 7/1966 | Allen | |
| 3,572,379 A | 3/1971 | Popa et al. | |
| 5,037,340 A * | 8/1991 | Shibata ....................... | 440/88 L |
| 6,409,557 B1 * | 6/2002 | Tsunekawa et al. ........ | 440/88 R |
| 6,415,758 B1 | 7/2002 | Pierro et al. | |
| 6,544,008 B1 | 4/2003 | Apostolides et al. | |
| 7,047,929 B2 | 5/2006 | Aketa et al. | |
| 7,121,248 B2 * | 10/2006 | Fukuda et al. ........... | 123/196 W |
| 7,137,789 B2 | 11/2006 | Apostolides et al. | |
| 7,350,497 B2 * | 4/2008 | Hiraoka et al. ........... | 123/196 R |
| 7,571,705 B2 * | 8/2009 | Inaba ......................... | 123/196 A |
| 7,845,856 B2 | 12/2010 | Shimizu et al. | |
| 8,074,999 B2 | 12/2011 | Burdick et al. | |
| 2003/0015166 A1 | 1/2003 | Seymour | |
| 2004/0108167 A1 | 6/2004 | Elliott | |
| 2009/0308249 A1 | 12/2009 | Anderson et al. | |

FOREIGN PATENT DOCUMENTS

RU     2166651 C2     5/2001

OTHER PUBLICATIONS

International Search Report and Written Opinion for PCT Application No. PCT/US2013/050881, dated Sep. 30, 2013, 7 pages.
International Search Report and Written Opinion for PCT Application No. PCT/US2013/050875, mail date Oct. 18, 2013, 6 pages.

* cited by examiner

*Primary Examiner* — Toan To
(74) *Attorney, Agent, or Firm* — Foley & Lardner LLP

(57) ABSTRACT

A power take-off system for an internal combustion engine that has a drive gear positioned within a crankcase includes a housing. The housing is coupleable to the internal combustion engine. The system also includes an input gear with a drive gear engagement portion, a toothed portion, and a shaft extending between the drive gear engagement portion and the toothed portion. The input gear is coupled to the housing such that the driver gear engagement portion is positioned within the crank case and the toothed portion is positioned within the housing. The input gear also includes a vent conduit that extends through the shaft. The vent conduit includes a first end open to the housing and a second end open to the crankcase.

20 Claims, 3 Drawing Sheets

POWER TAKE-OFF SYSTEM FOR AN INTERNAL COMBUSTION ENGINE

CROSS-REFERENCE TO RELATED APPLICATION

This application claims the benefit of U.S Provisional Patent Application No. 61/672,735filed on Jul. 17,2012, which is incorporated herein by reference.

FIELD

The present disclosure relates to power take-off systems commonly associated with internal combustion engines, and more particularly to sealing and venting such power take-off systems.

BACKGROUND

Some internal combustion engines utilize power take-off systems for powering auxiliary components, such as fuel and hydraulic pumps. Generally, power take-off systems harness a portion of the torque generated by an internal combustion engine and transfer the harnessed torque to one or more auxiliary systems using a gear train. Typically, the gears of the gear train are maintained in meshing engagement with each other within a housing. Desirably, an interior of the housing is supplied with a lubricant, such as oil, to lubricate the gears. The lubricant reduces friction and wear between meshing gears. Commonly, the lubricant is sealed within the housing to prevent leakage of the lubricant from the housing.

During operation of a power take-off system, the pressure of air within the housing may fluctuate based on operating conditions of the internal combustion engine. Generally, as the temperature of the air within the housing increases, the pressure of the air within the housing correspondingly increases. The temperature of the air within the housing may increase based on changes in the load placed on the internal combustion engine, changes in ambient temperature, and changes in other operating conditions of the engine. Modest pressure fluctuation within the housing of a power take-off system likely does not negatively affect the performance of the system. However, negative consequences (e.g., breakdown of seals, bearings, and the like) may result should the pressure within the housing reach or exceed certain pressure thresholds of the system.

Many conventional power take-off systems are equipped to vent air from the housing to compensate for extreme increases in pressure within the housing. Some systems vent air directly into the atmosphere. While such system may be effective at reducing the pressure within the housing, the air released from the housing into the atmosphere often contains lubricant. Accordingly, venting air from within the housing of a power take-off system directly into the atmosphere results in leakage of the lubricant, as well as a negative impact on the environment in the form of undesirable emissions.

SUMMARY

The subject matter of the present application has been developed in response to the present state of the art, and in particular, in response to the problems and needs in art associated with power take-off systems for internal combustion engines that have not yet been fully solved by currently available power take-off systems. Accordingly, the subject matter of the present application has been developed to provide a power take-off system, and associated apparatus and methods, that overcomes many of the shortcomings of the prior art. For example, in some embodiments, as opposed to prior art systems, the power take-off system of the present disclosure.

According to one embodiment, a power take-off system for an internal combustion engine that has a drive gear positioned within a crankcase includes a housing. The housing is coupleable to the internal combustion engine. The system also includes an input gear with a drive gear engagement portion, a toothed portion, and a shaft extending between the drive gear engagement portion and the toothed portion. The input gear is coupled to the housing such that the driver gear engagement portion is positioned within the crank case and the toothed portion is positioned within the housing. The input gear also includes a vent conduit that extends through the shaft. The vent conduit includes a first end open to the housing and a second end open to the crankcase.

In some implementations of the system, the vent conduit includes a central portion that is coaxial with a central axis of the input gear, an input portion that extends radially outwardly from the central portion, and an output portion that extends radially outwardly from the central portion. The input portion includes the first end and the output portion includes the second end.

According to some implementations, the system may also include a flow regulator positioned within the vent conduit. The flow regulator can be configured to allow air to flow through the vent conduit when a pressure within the housing exceeds a predetermined threshold, and prevent the flow of air through the vent conduit when the pressure within the housing does not exceed the predetermined threshold. The flow regulator can be a flow restrictor, and the flow regulator can be a one-way valve.

In certain implementations of the system, the housing defines an input gear channel. The input gear is positioned within the input gear channel. The system also includes a sealing assembly positioned between the input gear channel and the input gear. The sealing assembly includes a first annular seal press-fit against the input gear channel, a second annular seal positioned about the input gear, and an annular sleeve positioned between the first and second annular seals. The system may also include a locking nut that is coupled to the input gear between the sealing assembly and the drive gear. The second end can be positioned between the sealing assembly and the drive gear.

According to another embodiment, an input gear for a power take-off system coupled to a crankcase of an internal combustion engine includes a drive gear engagement portion, a toothed portion, a shaft that extends between the drive gear engagement portion and the toothed portion, and a vent conduit that extends through the shaft between the drive gear engagement portion and the toothed portion. The vent conduit includes a central portion that extends along a length of the shaft, an input portion that extends radially outwardly from the central portion, and an output portion that extends radially outwardly from the central portion.

In some implementations of the input gear, the input portion is positioned at a first end of the shaft and the output portion is positioned at a second end of the shaft opposite the first end of the shaft. The input gear may further include a flow restriction device that is positioned within the vent conduit between the input and output portions. The input gear may include a one-way valve positioned within the vent conduit between the input and output portions. A cross-sectional area of the central portion can be larger than a cross-sectional area of each of the input and output portions. The central portion can extend parallel to a central axis of the shaft. The central portion can be coaxial with a central axis of the shaft.

In yet an additional embodiment, a method for venting air from a power take-off housing to a crankcase of an internal combustion engine includes rotating an input gear relative to the housing. The input gear extends from a first location within the housing to a second location within the crankcase. The method further includes passing air from the power take-off housing to the crankcase through a conduit formed in the input gear while the input gear is rotating.

According to one embodiment, the conduit includes an input portion that is open to the housing and an output portion that is open to the crankcase. The input and output portions extend radially away from a central axis of the input gear. Rotating the input gear includes rotating the input and output portions about the central axis of the input gear. The method may include preventing the passage of air from the crankcase to the power take-off housing through the conduit. The passage of air can be prevented when a pressure within the power take-off housing is below a predetermined pressure threshold, and air can be passed from the power take-off housing to the crankcase when the pressure within the power take-off housing is above the predetermined pressure threshold.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
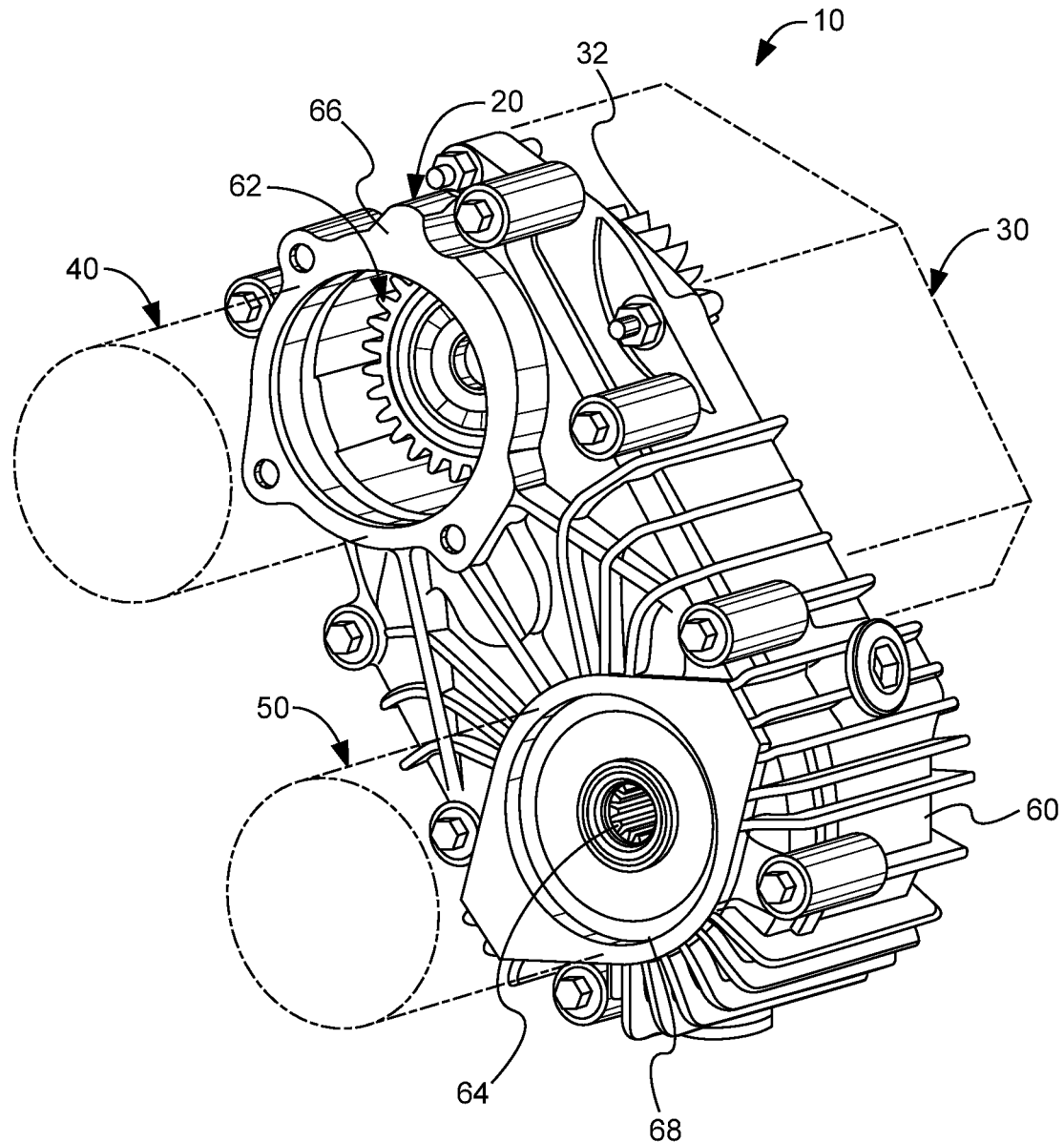
FIG. 1 is a perspective view of a power take-off system according to one embodiment.

Referring to FIG. 1, according to one embodiment, an internal combustion engine system 10 is shown. The internal combustion engine system 10 can include any of various types of engines known in the art. The engine includes a crankcase 30 that is coupled to or forms part of the engine block of the engine. The crankcase 30 provides a housing for a crankshaft (not shown) of the engine, one or more gears engaged with the crankshaft, and other various components. For example, as shown, the crankcase 30 houses a drive gear 32 that is driven, either directly or indirectly, by the crankshaft. The crankcase 30 defines an interior cavity 31 within which the crankshaft, the drive gear 32, and other components are positioned. The crankcase 30 also receives a supply of lubricant, such as oil, that splashes onto and lubricates the components within the crankcase. Additionally, although not shown, the crankcase 30 or engine block of the engine includes an air ventilation system that vents air from within the crankcase to the atmosphere. The air ventilation system of the crankcase 30 or engine block can by any of various air ventilation systems known in the art.

The engine system 10 also includes a power take-off system 20 coupled to the crankcase 30. The power take-off system 20 includes a housing 60 that is directly secured to the crankcase 30 in some embodiments. The housing 60 may include two halves that are coupled together by a series of fasteners. As shown in FIG. 1, the housing defines an interior cavity 70 that houses a gear train. The gear train includes an input gear 62 that is operatively coupled with the drive gear 32. Torque from the drive gear 32 is transferred to the power take-off system 20 via a tapered interference fit between the drive gear and the input gear 62. The gear train also includes a power transfer gear 64 and an idler gear 102. The power take-off system 20 transfers torque from the input gear 62 to the power transfer gear 64 via the idler gear 102 via gear-meshing engagement between the gears. The housing 60 may include bearings, such as bearings 100, 104, that are configured to reduce the frictional load on the rotating gears of the gear train.

Generally, the power take-off system 20 harnesses a portion of the torque generated by an internal combustion engine and transfers the harnessed torque to one or more auxiliary systems using the gear train. As shown, the power take-off system 20 transfers torque to a first auxiliary device 40 (or a mandatory device), and a second auxiliary device 50. Although not shown, the first and second auxiliary devices 40 and 50 each includes an input shaft operatively coupled to the gear train of the power take-off system 20. More specifically, in the illustrated embodiment, the first auxiliary device 40 includes an input shaft with a toothed portion that is engaged in gear-meshing engagement with the idler gear 102. Similarly, in the illustrated embodiment, the second auxiliary device 50 includes an input shaft with a splined portion that is engaged with mating splines formed in the power transfer gear 64. In this manner, rotation of the idler and power transfer gears 102, 64 correspondingly rotate the input shafts of the first and second auxiliary device 40, 50, respectively. The configuration of the gear train, including the types of gears used, can be different than illustrated without departing from the essence of the present disclosure. For example, the input gear 62 may be configured to directly receive the input shaft of the first auxiliary device 40, as opposed to directly via the idler gear 102, and the idler gear 102 may be a conventional spur gear. Each of the first and second auxiliary devices 40, 50 are configured to be mounted to respective mating surfaces 66, 68 of the housing 60. The mating surface 66, 68 are positioned about openings in the housing 60 through which the idler gear 102, power transfer gear 64, and interior cavity 70 are accessible.

The first and second auxiliary devices 40, 50 can be any of various types of auxiliary devices. In some embodiments, the first auxiliary device 40 is a mandatory device required for operation of the engine system 10. For example, in one implementation, the first device 40 is a fuel pump for supplying fuel from a fuel tank to the combustion chambers of the engine system 10. In other implementations, the first device 40 can be any of various other mandatory or non-mandatory devices. In some embodiments, the second auxiliary device 50 is an auxiliary device or accessory not required for operation of the engine system 10, but nonetheless is desirably powered by the engine. For example, in one implementation, the second auxiliary device 50 is a hydraulic pump required for operation of an accessory coupled to the engine system 10 or a vehicle in which the engine is housed. The accessory can be any of various accessories known in the art, such as, for example, fan pumps, steering pumps, and the like. In other implementations, the accessory can be any of various other accessories, such as, for example, forklifts, backhoes, augers, diggers, drills, water pumps, blower systems, winches, compactors, etc. In some implementations, the second auxiliary device 50 is the drive shaft of torque-powered accessory, such as a combine or other farm equipment accessory or machine. The second auxiliary device 50 may be an accessory that is installed by the end-user. For example, although not shown, one or more plates may be coupled to the housing 60 of the power take-off system 20 to prevent access to the power transferring gears of the power take-off system when the system is not in use. An end user may remove the plate from the housing 60 and attach a first and/or second auxiliary device to the housing in power transferring engagement with the system 20 when use of the system is desired.

The housing 60 contains a lubricant, such as oil, within the interior cavity 70. Similar to the crankcase 30, the lubricant splashes onto and lubricates the gears of the gear train, and other components, within the housing. In the illustrated embodiment, the lubrication is contained or sealed within the housing such that lubrication does not leak or escape from the housing. However, as discussed above, air should be allowed to vent from the housing in order to regulate the pressure within the housing. Accordingly, the power take-off system 20 of the present disclosure facilitates the venting of air from the housing 60, while restricting, and in some instances preventing, the escape of lubricant from the housing. Generally, the input gear 62 of the system 20 includes a vent conduit that vents air from the housing 60 to the crankcase. The configuration of the vent conduit within the input gear 62, together with the rotation of the input gear, allows air to flow through the vent conduit, but restricts the flow of lubrication through the conduit. In this manner, the power take-off system 20 provides both pressure relief functionality, as well as lubrication retention functionality.

Figure 2:
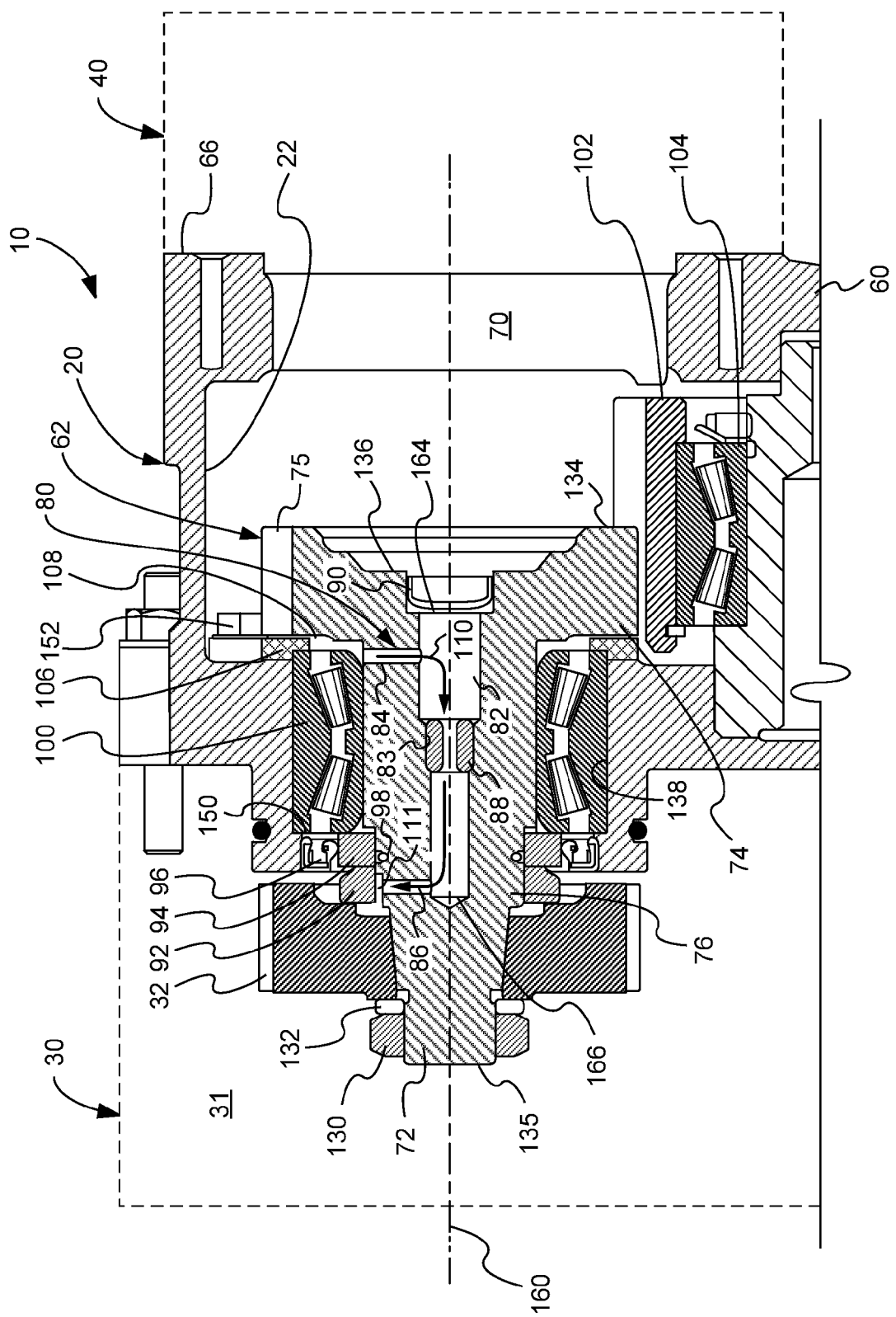
FIG. 2 is a cross-sectional side view of the power take-off system of FIG. 1 taken along the line 2-2 of FIG. 1.
Figure 3:
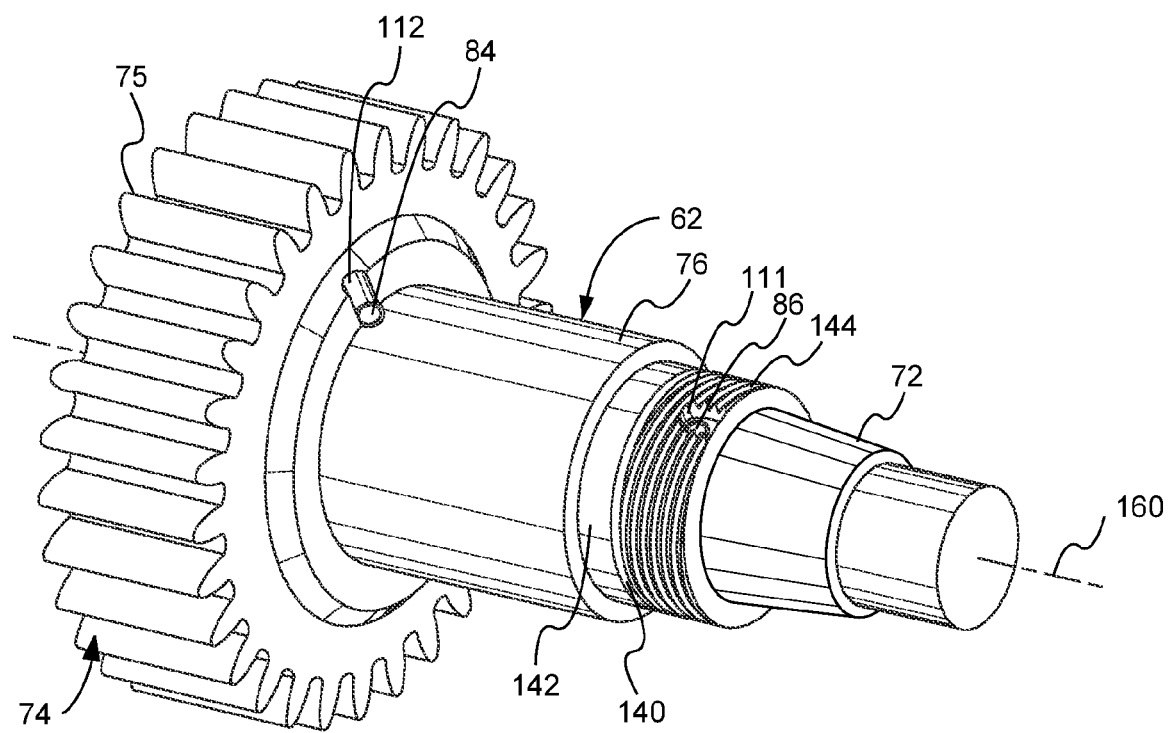
FIG. 3 is a perspective view of an input gear of a power take-off system according to one embodiment.

Referring to FIGS. 2 and 3, the input gear 62 includes a drive gear engagement portion 72, a toothed portion 74, and a central shaft 76 extending between the drive gear engagement portion and the toothed portion.

The drive gear engagement portion 72 (e.g., distal end portion) includes a tapered surface that matingly engages in an interference fit manner a corresponding tapered surface formed in a central aperture of the drive gear 32. Mating engagement between the tapered surfaces in this manner facilitates non-slipping, co-rotation of the input gear 62 and the drive gear 32. In other implementations, mating engagement between the drive gear engagement portion 72 and drive gear 32 can employ any of various types of engagement techniques to facilitate co-rotation, such as splined engagement, keyed engagement, and the like. The drive gear engagement portion 72 may also include external threads that matingly engage corresponding threads of a locking nut 130. Engagement between the threads of the drive gear engagement portion 72 and locking nut, as well as an intermediate washer 132, secure the drive gear 32 on the input gear 62. The splined portion of the drive gear engagement portion 72 and the central aperture of the drive gear 32 may be correspondingly tapered for ease of assembly and to provide a stop that prevents further axial movement in a proximal direction.

The toothed portion 74 (e.g., proximal end portion) of the input gear 62 includes a plurality of teeth 75 spaced-apart about a circumference of the input gear. The teeth are sized and shape to engage in gear-meshing engagement the teeth of the idler gear 102. The circumference of the illustrated toothed portion 74 is substantially larger than the circumference of the drive gear engagement portion 72 and the central shaft 76. However, the circumference of the toothed portion 74 can be any of various sizes to suit the configuration of a given gear train. Further, although not necessary, a proximal end 134 of the input gear 62 proximate the toothed portion 74 may include a recess or cavity 136 to accommodate input components of the first auxiliary device 40, and in some instances, to reduce weight.

The central shaft 76 is a cylindrical shaft with a length corresponding with the length of an input gear channel 138 formed in the housing 60. More specifically, the length of the central shaft 76 is selected to position the drive gear engagement portion 72 outside of the housing 60 (e.g., within the crankcase 30) and the toothed portion 74 within the interior cavity 70 of the housing when the input gear 62 is properly secured within the input gear channel 138 of the housing. The central shaft 76 may include external features to facilitate assembly of the power take-off system 20 and the coupling of various components to the central shaft. For example, the central shaft 76 of the illustrated embodiment includes a groove 140 for receiving a sealing member, such as O-ring 98. Also, the illustrated central shaft 76 includes a lip or step 142 for receiving a retaining nut 92 and sleeve 94. The step 142 may include external threads 144 that mate with corresponding threads on the retainer nut 92. The sleeve 94 also may include external threads that mate with the threads 144 of the step 142. Alternatively, the sleeve 94 may be press-fit against a portion of the step 142 without external threads. In either implementation, the retaining nut 92 and sleeve 94 are secured to the central shaft 76 in a manner that facilitates co-rotation of the retaining nut and sleeve with the central shaft.

The input gear 62 is rotatably coupled to the housing 60 by rotatably retaining the central shaft 76 within the input gear channel 138. In the illustrated implementation, the central shaft 76 is rotatably retained within the input gear channel 138 via rotational engagement with the bearing 100. The bearing 100 can be press-fit within the input gear channel 138 in one implementation. Additionally, or alternatively, the bearing 100 can be axially secured within the input gear channel 138 by positioning the bearing between a lip or stop 150 formed in the channel and a plate 106 fastened to the housing 60 via one or more fasteners 152. The bearing 100 includes a fixed portion that is fixed relative to the input gear channel 138, and a rotational portion that is rotatable relative to the fixed portion. The central shaft 76 can be press-fit against the rotational portion such the central shaft co-rotates with the rotational portion of the bearing 100 about a central axis 160 of the input gear 62.

With the central shaft 76 rotatably retained within the input gear channel 138 as described above, the drive gear engagement portion 72 of the input gear 62 is positioned outside of the housing 60 within interior cavity 31 of the crankcase 30, and the toothed portion 74 of the input gear is positioned within the interior cavity 70 of the housing 60. Moreover, with the central shaft 76 rotatably retained in this manner, the seal between the O-ring 98 and the sleeve 94, as well as the press-fit seal between the central shaft and the bearing 100, prevents the passage of air and fluid between the interior cavity 70 of the housing 60 and the interior cavity 31 of the crankcase 30. However, air must be allowed to pass from the interior cavity 70 of the housing 60 to the interior cavity 31 of the crankcase 30 to regulate (e.g., decrease) the pressure within the interior cavity of the housing. Accordingly, the input gear 62 includes an air vent conduit 80 configured to release air from the housing 60 into the crankcase 30 when the pressure within the housing is at least higher than the pressure within the crankcase.

The air vent conduit 80 is formed in the input gear 62. Accordingly, the air vent conduit 80 extends internally through the input gear 62. In other words, while the release of air is prevented from passing around the external surface of the input gear 62, air 110 is selectively allowed to pass through the input gear via the air vent conduit 80. As shown in FIG. 2, the air vent conduit 80 includes a central portion 82, an input portion 84, and an output portion 86.

The central portion 82 is defined within the shaft 76 of the input gear 62 and extends longitudinally along the shaft. In the illustrated embodiment, the central portion 82 is coaxial with the central axis 160 of the input gear 62. However, in other embodiments, the central portion 82 is not coaxial with the central axis. For example, if desired, the central portion 82 can be offset from the central axis 160 of the input gear 62. Further, although the central portion 82 in the illustrated embodiment extends substantially parallel to the central axis 160, in other embodiments, the central portion can extend at an angle relative to the central axis. The central portion 82 may have a substantially circular cross-sectional shape, or some other cross-sectional shape as desired. A cross-sectional area of the central portion 82 can be constant or may vary along the length of the central portion. For example, in the illustrated embodiment, the cross-sectional area of the central portion 82 decreases in a stepped manner in a direction extending from the toothed portion 74 to the drive gear engagement portion 72. In this manner, the central portion 82 includes an intermediate section 83 with an intermediate cross-sectional area. As will be described in more detail below, the intermediate section 83 is sized to receive a flow regulating device 88 or flow regulator.

The input and output portions 84, 86 are open to the central portion 82 and extend radially outwardly away from the central portion. The input and output portions 84, 86 are spaced apart from each other and positioned at opposing end sections of the central portion 82. For example, the input portion 84 is positioned proximate an inlet end section 164 of the central portion 82, and the output portion 86 is positioned proximate an outlet end section 166. Generally, the input and output portions 84, 86 are defined within the shaft 76 at locations along the central portion 82 that allow the input and output portions to be open to the interior cavity 70 of the housing 60 and the interior cavity 31 of the crankcase 30, respectively.

As shown, a radially outward end of the input portion 84 is open to a portion 108 of the interior cavity 70 between the toothed portion 74 of the input gear 62, and the bearing 100 and plate 106. Similarly, a radially outward end of the output portion 86 is open to a portion of the interior cavity 31 between the drive gear 32 and the retainer nut 92. In some implementations, the radially outward end of the output portion 86 may include a channel or notch 111 formed in the step 142 of the input gear. The notch 111 may be covered by the retaining nut 92 thus forming a conduit sub-section through which air is flowable into the crankcase 30. In the illustrated embodiment, the input and output sections 84, 86 extend substantially perpendicularly relative to the central axis 160. However, in other embodiments, the input and output sections 84, 86 may extend away from the central portion 82 at angles more or less than perpendicular relative to the central axis 160 as long as the input and output sections are open to the housing and crankcase, respectively.

The input gear 62 and air conduit 80 can be formed using any of various manufacturing techniques, such as casting and machining. Further, the input gear 62 can be formed in the same general manufacturing step with the air conduit 80, or an existing pre-manufactured input gear can be retrofitted with an air conduit. In the illustrated embodiment, the central portion 82 of the air conduit 80 is formed in the input gear 62 by drilling a hole using one or more variably-sized drills through the proximal end 134 and into the shaft 76. The opening of the hole is capped using a cap 90 that seals the open end of the hole. Alternatively, if desired, the central portion 82 can be formed in the input gear 62 by drilling a hole through the distal end 135 and into the shaft 76. The opening of the hole in the distal end could be similarly capped. The input and output portions 84, 86 can be formed by drilling separate holes through the shaft 76 (and, in some implementations, the toothed portion 74) and into the central portion 82 at desired angles. The input gear 62 with the air conduit 80 can then be installed (or reinstalled in the case of a retrofitted input gear) in the housing 60.

As described above, in some embodiments, the air conduit 80 includes a flow regulating device 88. Generally, the flow regulating device 88 is positioned within the central portion 82 of the conduit 80. In the illustrated embodiment, the flow regulating device 88 is seated within the intermediate section 83 of the conduit 80. The flow regulating device 88 can be a flow restriction device with a fixed fluid passage that is narrower than the central portion 82. The restriction device regulates the flow of air through the conduit 80 by restricting the flow of air through the device, particularly during rapid and extreme fluctuations in the pressure (e.g., pressure surges) within the crankcase 30 or housing 60.

Additionally, or alternatively, the flow regulating device 88 can be a one-way valve that limits the flow of air through the air conduit 80 in a single direction (i.e., a power take-off housing to crankcase direction) as indicated by directional arrows 110. Additionally, the one-way valve prevents lubricant in the crankcase 30 from flowing into the housing 60 via the air conduit 80. Moreover, the one-way valve may be configured to open only under a predetermined pressure. The predetermined pressure can be any pressure at or above a desired pressure threshold. In one implementation, the desired pressure threshold may be selected to maintain a higher pressure in the power take-off housing 60 than in the crankcase 30. A higher pressure in the housing 60 compared to the crankcase 30 may improve the sealing capabilities of the system 20. The one-way valve is a passive valve, but in other implementations, the valve may be an actively or variably controlled valve.

Although the illustrated embodiment of the input gear 62 includes a single air conduit 80, in other embodiments, the input gear 62 may include multiple air conduits. For example, in one implementation, the input gear 62 includes a single central portion, but has multiple input portions 84, multiple output portions 86, or both, fluidly coupled with the single central portion. The multiple input portions 84 and/or output portions 86 may be circumferentially spaced apart from each other or axially spaced apart from each other. Alternatively, the input gear 62 may include multiple discrete air conduits 80 each with a separate central portion and associated input and output portions.

Also, although the central portion 82 of the illustrated embodiment is an enclosed conduit (e.g., enclosed on all sides by the shaft 76), in some embodiments, the central portion 82 may be an open channel formed in an outer surface of the shaft. In such embodiments, the central portion is defined between the open channel and the radially inner surface of the bearing 100. Further, in such embodiments, the air conduit may not have radially outwardly extending input and output portions as they may not be necessary to fluidly couple the central portion with the interior cavities of the housing and crankcase.

During operation of the engine, the input gear 62 is rotatably driven by the drive gear 32. As the drive gear 32 rotates, the lubricant within the crankcase 30 splashes on and lubricates the drive gear. Similarly, as the input gear 62 rotates, the lubricant within the housing 60 splashes on and lubricates the input gear. The air conduit 80 also rotates about the central axis 160 of the input gear 62 as the input gear rotates. For air conduits 80 with a central portion 82 coaxial with the central axis 160, the position of the central portion is fixed relative to the central axis. However, because the input and output portions 84, 86 extend radially away from the central axis 160, the input and output portions (e.g., the open ends of the input and output portions open to the housing and crankcase, respectively) move circumferentially about the central axis and within the housing and crankcase, respectively. Because the open ends of the input and output portions 84, 86 are moving in a circular pattern within the housing and crankcase, respectively, centrifugal forces act on the heavier and denser lubricant within the housing and crankcase to resist entry of lubricant into the air conduit. However, the lighter and less dense air within the housing and crankcase is able to relatively freely enter the air conduit despite the centrifugal forces acting on the air. In this manner, air within the housing is able to vent to the crankcase through the rotating air conduit 80, while lubricant within the housing is substantially prevented from flowing (e.g., leaking) into the crankcase through the rotating air conduit. Such selective restriction of lubricant and allowance of air through the air conduit by virtue of rotating the air conduit may not be achievable with a non-spinning, direct vent.

In some embodiments, some lubricant may leak into the air conduit 80 during operation. However, only a nominal amount of lubricant is allowed to collect within the conduit 80 before centrifugal forces acting on the lubricant force at least some of the lubricant out of the conduit and back into the housing 60 and/or crankcase 30. In this manner, lubricant is prevented from building up within the conduit and blocking the flow of air through the conduit.

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

Reference throughout this specification to features, advantages, or similar language does not imply that all of the features and advantages that may be realized with the subject matter of the present disclosure should be or are in any single embodiment or implementation of the subject matter. Rather, language referring to the features and advantages is understood to mean that a specific feature, advantage, or characteristic described in connection with an embodiment is included in at least one embodiment of the subject matter of the present disclosure. Discussion of the features and advantages, and similar language, throughout this specification may, but do not necessarily, refer to the same embodiment or implementation.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A power take-off system for an internal combustion engine having a drive gear positioned within a crankcase, comprising:
    a housing coupleable to the internal combustion engine; and
    an input gear comprising a drive gear engagement portion, a toothed portion, and a shaft extending between the drive gear engagement portion and the toothed portion, the input gear being coupled to the housing such that the driver gear engagement portion is positioned within the crank case and the toothed portion is positioned within the housing;
    wherein the input gear further comprises a vent conduit extending through the shaft, the vent conduit comprising a first end open to the housing and a second end open to the crankcase.

2. The power take-off system of claim 1, wherein the vent conduit comprises a central portion that is coaxial with a central axis of the input gear, an input portion extending radially outwardly from the central portion, and an output portion extending radially outwardly from the central portion, and wherein the input portion comprises the first end and the output portion comprises the second end.

3. The power take-off system of claim 1, further comprising a flow regulator positioned within the vent conduit.

4. The power take-off system of claim 3, wherein the flow regulator is configured to allow air to flow through the vent conduit when a pressure within the housing exceeds a predetermined threshold, and prevent the flow of air through the vent conduit when the pressure within the housing does not exceed the predetermined threshold.

5. The power take-off system of claim 3, wherein the flow regulator comprises a flow restrictor.

6. The power take-off system of claim 3, wherein the flow regulator comprises a one-way valve.

7. The power take-off system of claim 1, wherein the housing defines an input gear channel, the input gear being positioned within the input gear channel, further comprising a sealing assembly positioned between the input gear channel and the input gear, the sealing assembly comprising a first annular seal press-fit against the input gear channel, a second annular seal positioned about the input gear, and an annular sleeve positioned between the first and second annular seals.

8. The power take-off system of claim 7, further comprising a locking nut coupled to the input gear between the sealing assembly and the drive gear.

9. The power take-off system of claim 7, wherein the second end is positioned between the sealing assembly and the drive gear.

10. An input gear for a power take-off system coupled to a crankcase of an internal combustion engine, comprising:
   a drive gear engagement portion;
   a toothed portion;
   a shaft extending between the drive gear engagement portion and the toothed portion; and
   a vent conduit extending through the shaft between the drive gear engagement portion and the toothed portion, the vent conduit comprising a central portion extending along a length of the shaft, an input portion extending radially outwardly from the central portion, and an output portion extending radially outwardly from the central portion.

11. The input gear of claim 10, wherein the input portion is positioned at a first end of the shaft and the output portion is positioned at a second end of the shaft opposite the first end of the shaft.

12. The input gear of claim 10, further comprising a flow restriction device positioned within the vent conduit between the input and output portions.

13. The input gear of claim 10, further comprising a one-way valve positioned within the vent conduit between the input and output portions.

14. The input gear of claim 10, wherein a cross-sectional area of the central portion is larger than a cross-sectional area of each of the input and output portions.

15. The input gear of claim 10, wherein the central portion extends parallel to a central axis of the shaft.

16. The input gear of claim 10, wherein the central portion is coaxial with a central axis of the shaft.

17. A method for venting air from a power take-off housing to a crankcase of an internal combustion engine, comprising:
   rotating an input gear relative to the housing, the input gear extending from a first location within the housing to a second location within the crankcase; and
   passing air from the power take-off housing to the crankcase through a conduit formed in the input gear while the input gear is rotating.

18. The method of claim 17, wherein the conduit comprises an input portion open to the housing and an output portion open to the crankcase, the input and output portions extending radially away from a central axis of the input gear, and wherein rotating the input gear comprises rotating the input and output portions about the central axis of the input gear.

19. The method of claim 17, further comprising preventing the passage of air from the crankcase to the power take-off housing through the conduit.

20. The method of claim 19, wherein the passage of air is prevented when a pressure within the power take-off housing is below a predetermined pressure threshold, and wherein air is passed from the power take-off housing to the crankcase when the pressure within the power take-off housing is above the predetermined pressure threshold.

* * * * *